US012684100B2

(12) United States Patent
  Yokokubo

(10) Patent No.: US 12,684,100 B2
(45) Date of Patent: Jul. 14, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Yuji Yokokubo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/921,344

(22) Filed: Oct. 21, 2024

(65) Prior Publication Data

US 2025/0150568 A1    May 8, 2025

(30) Foreign Application Priority Data

Nov. 2, 2023    (JP) .................................. 2023-188500

(51) Int. Cl.
  *H04N 13/00* (2018.01)
  *H04N 13/122* (2018.01)
(52) U.S. Cl.
  CPC ... *H04N 13/122* (2018.05); *H04N 2013/0074* (2013.01)
(58) Field of Classification Search
  None
  See application file for complete search history.

(56) References Cited

U.S. PATENT DOCUMENTS

2012/0229628 A1*  9/2012  Ishiyama ............. H04N 13/239
                                                                            348/135
2018/0007344 A1*  1/2018  Cohen .................. H04N 13/106

FOREIGN PATENT DOCUMENTS

JP            5297899 B2    9/2013

OTHER PUBLICATIONS

Han et al. "Photometric and Geometric Rectification for Stereo-scopic Images". (Year: 2012).*

* cited by examiner

*Primary Examiner* — Zhihan Zhou
(74) *Attorney, Agent, or Firm* — Venable LLP

(57) ABSTRACT

An information processing apparatus includes an obtainment unit configured to obtain a pair of images constituting a parallax image for achieving stereoscopic vision, an association unit configured to generate association data linking corresponding pixels in the pair of images constituting the parallax image obtained by the obtainment unit, and a correction unit configured to correct vertical misalignment between corresponding pixels in the pair of images based on the generated association data.

15 Claims, 14 Drawing Sheets

$\Phi_L < \Phi_R$

ELEVATION ANGLE OF
LIGHT RAY IS LARGER
ON SIDE CLOSER TO OBJECT $\Phi'_L = \Phi'_R$ IS DESIRABLE
AT IMAGE VIEWING

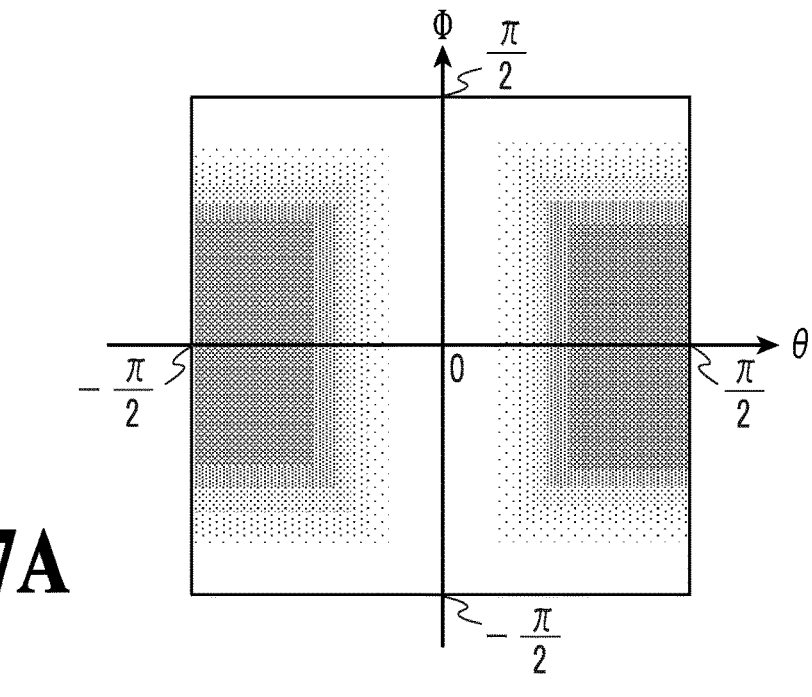
FIG.7A
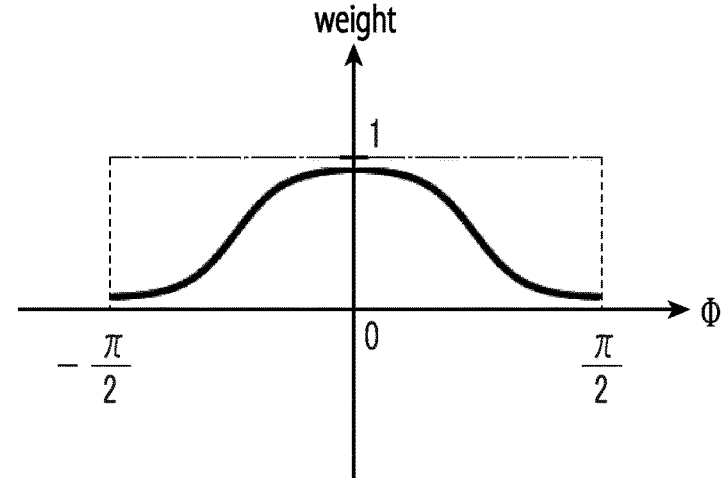
FIG.7B
FIG.7C

FISHEYE PARALLAX IMAGE

1101

1103   1105

1106

1104

1102

CORRESPONDENCE (UV COORDINATE) OF APEX AND FRAME PIXEL

LEFT-EYE MESH      RIGHT-EYE MESH

FISHEYE PARALLAX IMAGE

1301

1302

COR
(UV
APE)

LEFT-EYE MESH　　RIGHT-EYE MESH 1401                   1402      1400

| (AZIMUTH ANGLE $\theta$、 ELEVATION ANGLE $\phi$) | CORRECTION WEIGHT |
|---|---|
| $(0\sim\pi/16、7\pi/16\sim\pi/2)$ | 0. 1 |
| · | |
| $(-\pi/2\sim-7\pi/16、0\sim\pi/16)$ | 0. 9 |
| · | |
| $(-\pi/16\sim0、0\sim\pi/16)$ | 0. 1 |
| · | |
| $(7\pi/16\sim\pi/2、0\sim\pi/16)$ | 0. 9 |
| · | |
| $(0\sim\pi/16、-\pi/2\sim-7\pi/16)$ | 0. 1 |

FIG.14

INFORMATION PROCESSING APPARATUS, INFORMATION PROCESSING METHOD, AND STORAGE MEDIUM

BACKGROUND

Field

The present disclosure relates to technologies of obtaining a parallax image for achieving stereoscopic vision.

Description of the Related Art

In a left-eye image and a right-eye image constituting a parallax image for achieving stereoscopic vision, it is important to suppress vertical misalignment to suppress user eye strain, fusion failure, and the like. In this regard, in Japanese Patent No. 5297899, the amount of misalignment between images is calculated by using a left-eye image and a right-eye image that are obtained by capturing a diagonal line, and the whole images are rotated and translated based on the result of the calculation to suppress vertical misalignment.

SUMMARY

An information processing apparatus according to an aspect of the present disclosure includes an obtainment unit configured to obtain a pair of images constituting a parallax image for achieving stereoscopic vision, an association unit configured to generate association data linking corresponding pixels in the pair of images constituting the parallax image obtained by the obtainment unit, and a correction unit configured to correct vertical misalignment between corresponding pixels in the pair of images based on the generated association data.

Further features of the present disclosure will become apparent from the following description of exemplary embodiments with reference to the attached drawings.

BRIEF DESCRIPTION OF THE DRAWINGS

FIGS. 7A to 7C are diagrams illustrating an exemplary correction weight;

FIG. 14 is a diagram illustrating an exemplary correction amount table.

DESCRIPTION OF THE EMBODIMENTS

Recently, a head-mounted display that is mounted on the head of a user and with which the user directly views a video displayed in front of the eyes has been widely used. The head-mounted display displays a parallax image generated by performing processing such as image geometric conversion and mesh-mapping on input images obtained by image capturing with, for example, a parallax image capturing apparatus including two fisheye lenses, in some cases. Even in a case where the same object is included in each of a left-eye image and a right-eye image constituting the above-described input images, the object is recorded as light rays with incident angles of different elevation angles depending on the distance to the object and the angle of the object relative to the optical axis direction of a camera, and positional misalignment occurs in the vertical direction. In this case, even when Japanese U.S. Pat. No. 5,297,899 is applied to rotate and translate the whole images, appropriate correction cannot be performed if the amount of vertical misalignment is different among the positions of pixels in the images, and thus there has been the likelihood of causing discomfort when images displayed on a head-mounted display or the like are viewed.

Embodiments for performing the technologies of the present disclosure will be described below with reference to the accompanying drawings. The embodiments below do not limit the claims, and not all combinations of features described in the embodiments are necessarily essential for solution of the technologies of the present disclosure.

First Embodiment

Figure 1:
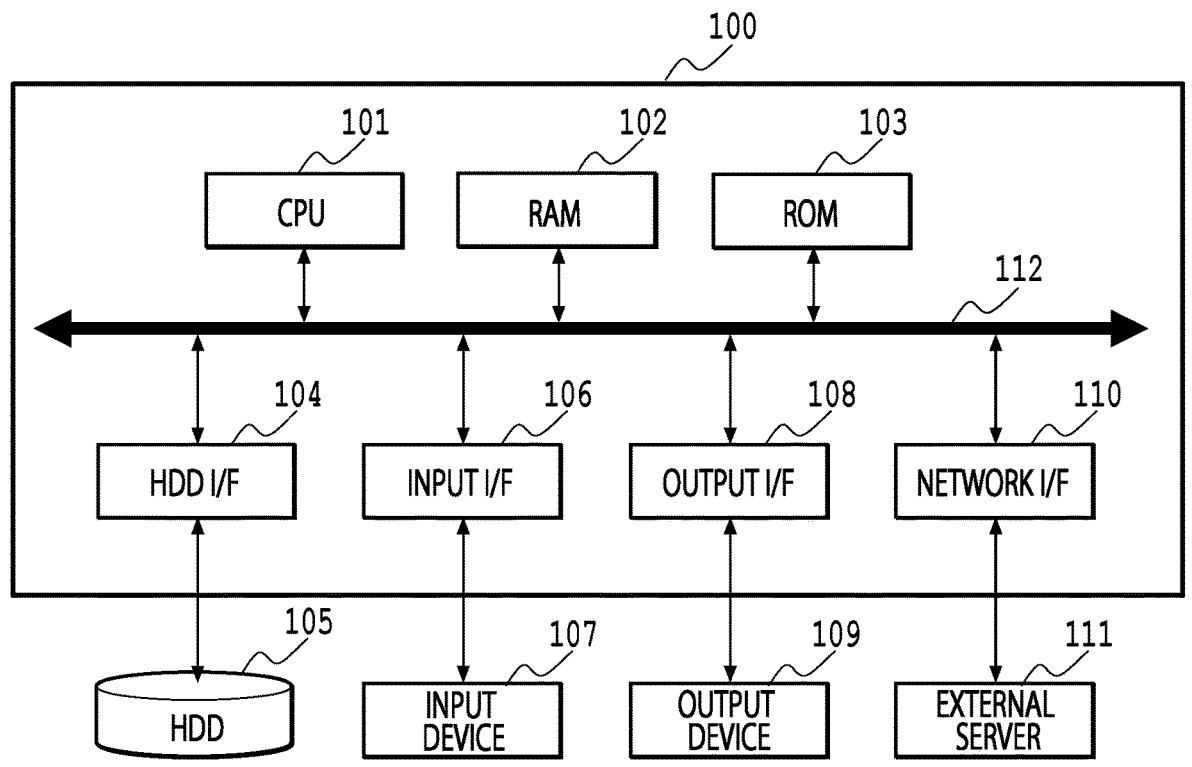
FIG. 1 is a block diagram illustrating an exemplary hardware configuration of an information processing apparatus.

FIG. 1 is a diagram illustrating an exemplary hardware configuration of an information processing apparatus according to the present embodiment. This information processing apparatus 100 includes a CPU 101, a RAM 102, a ROM 103, a HDD interface (hereinafter, interface is abbreviated as "I/F") 104, an input I/F 106, an output I/F 108, and a network I/F 110. These are connected to a system bus 112 to be able to transmit and receive data. The HDD I/F 104 is connected to a hard disk drive (HDD) 105. The input I/F 106 is connected to an input device 107. The output I/F 108 is connected to an output device 109. The network I/F 110 is connected to an external server 111.

The CPU 101 executes computer programs stored in the ROM 103 and the HDD 105 by using the RAM 102 as a work memory and controls operation of blocks to be described later through the system bus 112. The HDD I/F 104 is also connected to a secondary storage apparatus such as an optical disk drive in addition to the HDD 105. The HDD I/F 104 is an I/F such as a serial ATA (SATA). The CPU 101 can perform, through the HDD I/F 104, data reading from the HDD 105 and data writing to the HDD 105. In addition, the CPU 101 can load data stored in the HDD 105 onto the RAM 102 and can store data loaded on the RAM 102 into the HDD 105. The CPU 101 can further execute data loaded on the RAM 102 as computer programs. The input I/F 106 is connected to the input device 107 such as a keyboard, a mouse, a digital camera, and a scanner. The input I/F 106 is a serial bus I/F such as USB or IEEE 1394. The CPU 101 can read data from the input device 107 through the input I/F 106. The output I/F 108 connects the information processing apparatus 100 to a head-mounted display mounted on the head of a user, as an output device. The output I/F 108 is a video output I/F such as DVI or HDMI (registered trademark). The CPU 101 can feed data to the head-mounted display through the output I/F 108 and display a predetermined video on the head-mounted display.
(Functional Configuration of Information Processing Apparatus)

Figure 2:
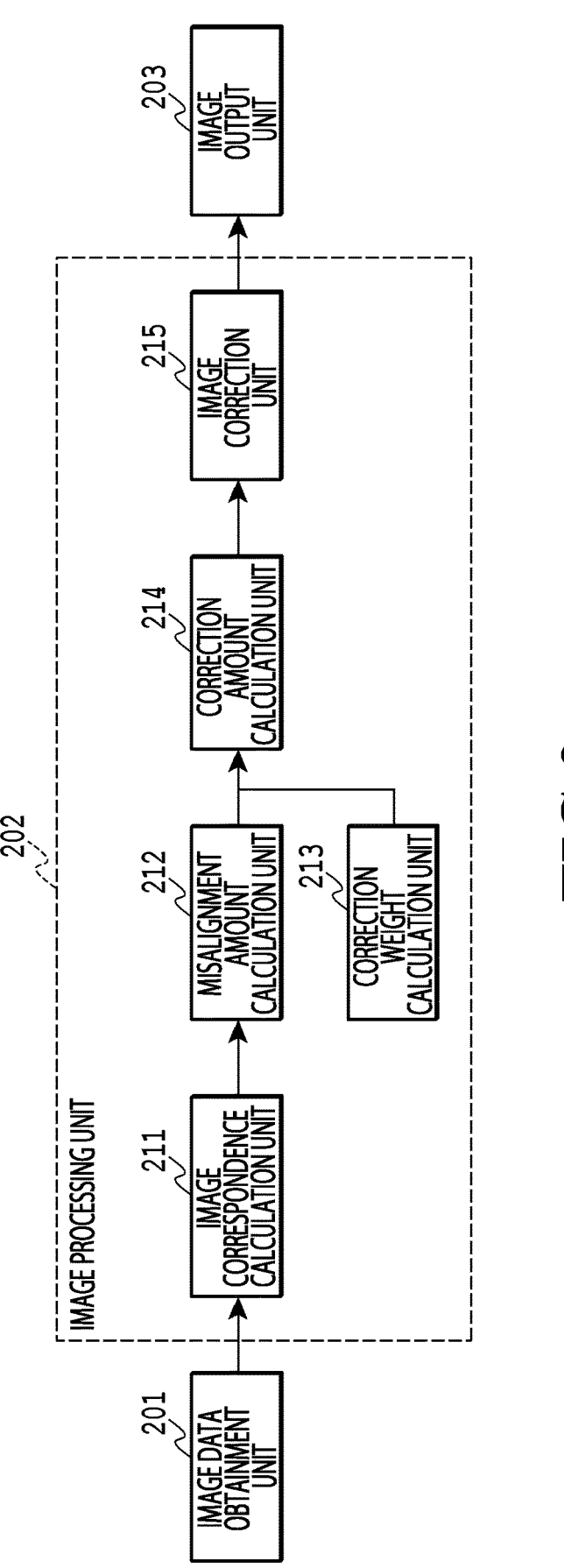
FIG. 2 is a block diagram illustrating an exemplary functional configuration of the information processing apparatus.

FIG. 2 is a block diagram illustrating an exemplary functional configuration of the information processing apparatus 100. The information processing apparatus 100 of the present embodiment generates, from a parallax image represented by input image data, a corrected parallax image (corrected image) with suppressed vertical misalignment between corresponding pixels.

The information processing apparatus 100 of the present embodiment includes an image data obtainment unit 201, an image processing unit 202, and an image output unit 203. The image processing unit 202 includes an image correspondence calculation unit 211, a misalignment amount calculation unit 212, a correction weight calculation unit 213, a correction amount calculation unit 214, and an image correction unit 215.

In the present embodiment, the image processing unit 202 generates association data linking corresponding pixels in a pair of images constituting a parallax image represented by image data obtained by the image data obtainment unit 201. Subsequently, the image processing unit 202 calculates the amount of vertical misalignment between corresponding pixels in the pair of images based on the generated association data. Subsequently, the image processing unit 202 performs correction for each pixel in the pair of images to suppress vertical misalignment between corresponding pixels in the pair of images based on the calculation result. Display images generated based on a corrected parallax image constituted by the pair of images after the correction are output to the head-mounted display, and accordingly, the following effect can be obtained. Specifically, the user on which the head-mounted display is mounted can view images with a reduced likelihood of causing discomfort as compared to a case with the parallax image before the correction.

In the image processing unit 202, first, the image correspondence calculation unit 211 associates pixels in a pair of left and right images constituting a parallax image and generates association data linking corresponding pixels. In other words, the image correspondence calculation unit 211 associates pixels in left-eye and right-eye images constituting a parallax image and calculates association information indicating the result of the association. The misalignment amount calculation unit 212 calculates the amount of vertical misalignment between corresponding pixels in the pair of images based on the association data generated by the image correspondence calculation unit 211.

The correction weight calculation unit 213 calculates a correction weight based on the incident angle of a captured light ray. The correction amount calculation unit 214 calculates a correction amount for each image pixel based on the vertical misalignment amount acquired through the calculation by the misalignment amount calculation unit 212 and the correction weight acquired through the calculation by the correction weight calculation unit 213. The image correction unit 215 performs correction for each pixel in the pair of images to suppress vertical misalignment between corresponding pixels in the pair of images based on the correction amount for each pixel in the pair of images and generates a corrected parallax image (corrected image).

Then, the image output unit 203 outputs the corrected parallax image generated by the image processing unit 202 to the HDD 105 or the like as a file.
(Corrected Parallax Image Generation Processing)

Figure 3:
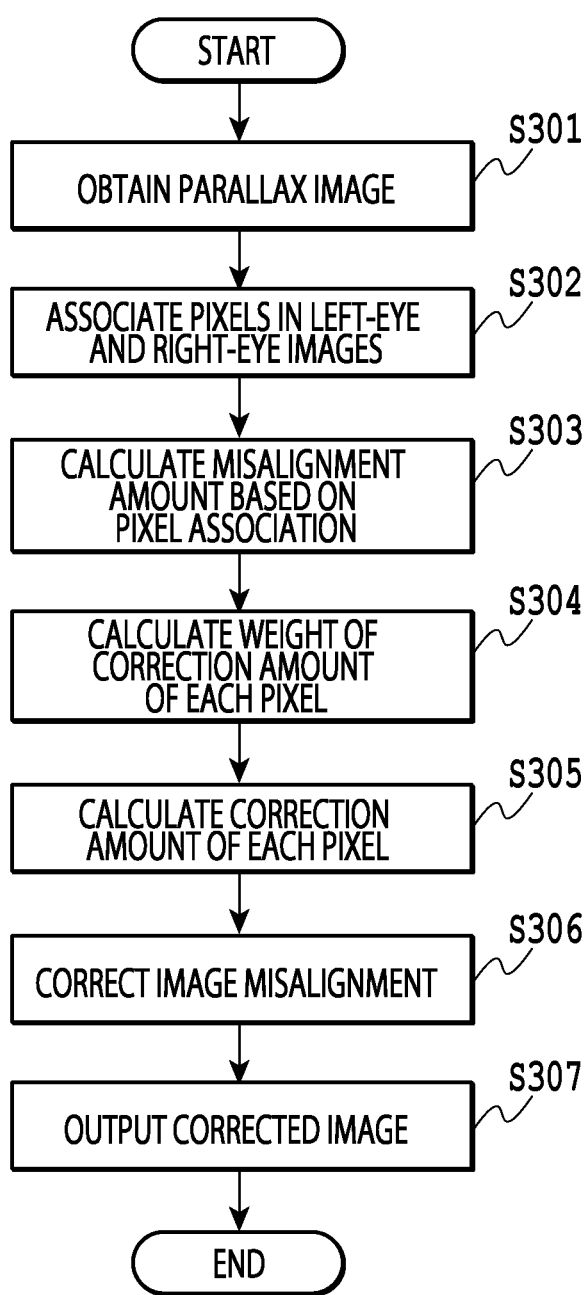
FIG. 3 is a flowchart illustrating the process of processing executed by the information processing apparatus.

FIG. 3 is a flowchart illustrating the process of corrected parallax image generation processing. The functions of blocks in FIG. 2 and steps in FIG. 3 are achieved as the CPU 101 reads program codes stored in a storage region such as the ROM 103 onto the RAM 102 and executes the program codes. Alternatively, the functions of some or all blocks in FIG. 2 and steps in FIG. 3 may be implemented by hardware such as an ASIC or an electronic circuit. Hereinafter, a symbol "S" means a step in a flowchart.

At S301, the image data obtainment unit 201 obtains image data from the HDD 105 or the input device 107. The image data is image data representing left-eye and right-eye images with parallax and is, for example, image data representing an equirectangular image of 180° (hereinafter referred to as 180° equirectangular parallax image). In other words, left-eye and right-eye images are a pair of images constituting a parallax image. The above-described image data is not limited to a 180° equirectangular parallax image but may be image data representing stereo images, panorama images (wide-angle images), or the like. The obtained image data is sent to the image correspondence calculation unit 211.

The following describes an example in which a 180° equirectangular parallax image is obtained as the above-described image data. The 180° equirectangular parallax image is an image obtained by performing equirectangular projection processing and conversion on two images (left-eye and right-eye images) having parallax and acquired by capturing with a parallax image capturing apparatus including two fisheye lenses.
(180° Equirectangular Parallax Image)

Figure 4:
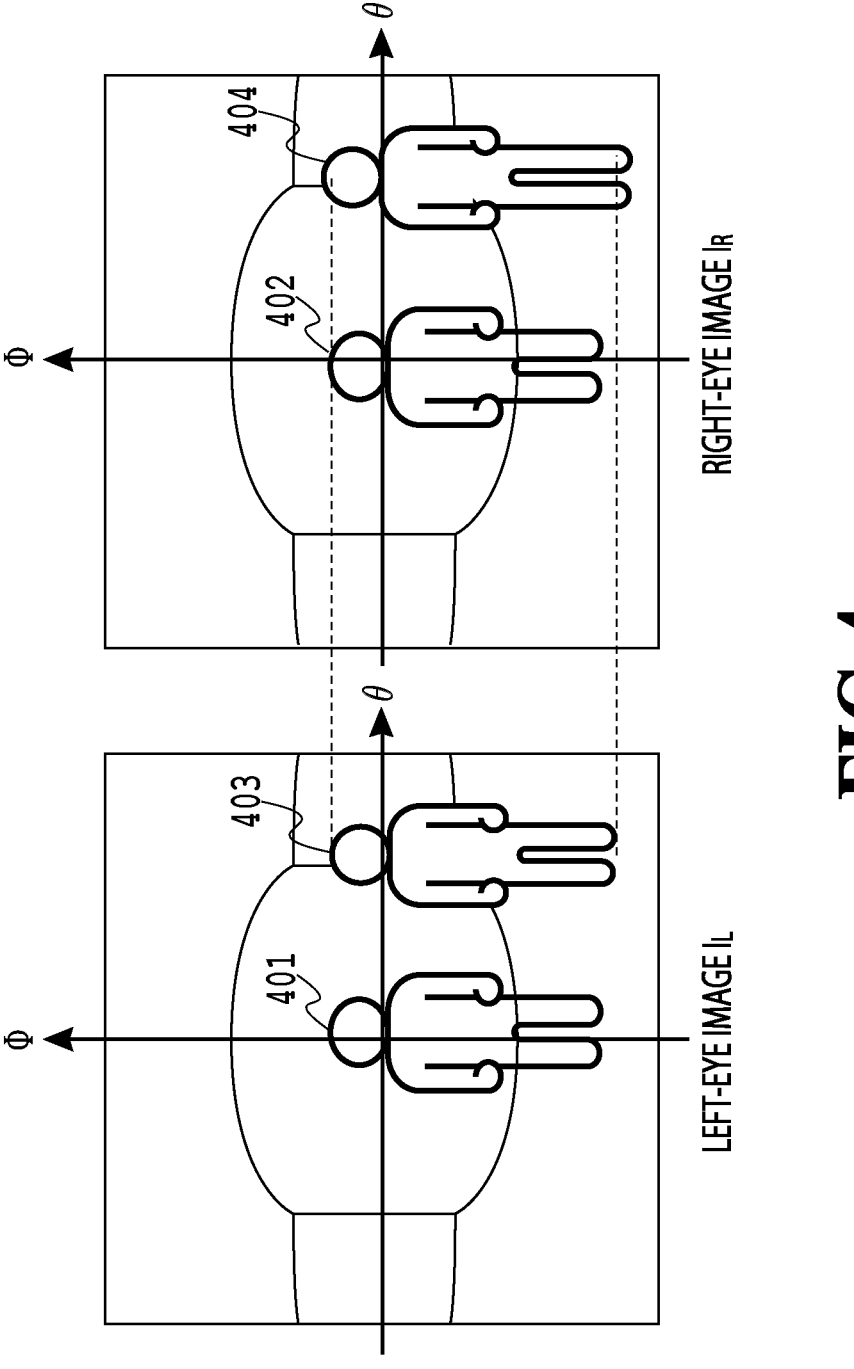
FIG. 4 is a diagram illustrating an exemplary 180° equirectangular parallax image.

FIG. 4 is a diagram illustrating an exemplary 180° equirectangular parallax image. Image data representing the 180° equirectangular parallax image illustrated in FIG. 4 is image data storing colors that represent incident light rays in a direction of 180° horizontally and 180° vertically relative to a reference position. In the present embodiment, a left-eye 180° equirectangular image (hereinafter also referred to as a left-eye image) is denoted by $I_L$, and a right-eye 180° equirectangular image (hereinafter also referred to as a right-eye image) is denoted by $I_R$. In the present embodiment, the left-eye and right-eye images $I_L$ and $I_R$ are handled as an input parallax image. FIG. 4 illustrates the left-eye and right-eye images $I_L$ and $I_R$ in a coordinate system with an azimuth angle $\theta$ [$-\pi/2$ to $\pi/2$] on the horizontal axis and an elevation angle $\phi$ [$-\pi/2$ to $\pi/2$] on the vertical axis. In a case where identical objects, such as objects 401 and 402 at the front (center), appear at positions with the same elevation angle in the left-eye and right-eye images $I_L$ and $I_R$, the left-eye and right-eye images can be viewed without vertical misalignment between left and right images on the head-mounted display. However, in a case where identical objects, such as objects 403 and 404 at positions separated from the front, appear at different positions (positions with different elevation angles) in the vertical direction in the left-eye and right-eye images $I_L$ and $I_R$, these images potentially cause difficulty in fusion and a sense of discomfort when viewed.

Since the vertical axis in equirectangular projection represents the elevation angle, positional misalignment in the vertical direction may represent misalignment in the elevation angle of an incident light ray.

(Configuration of Image Capturing Apparatus and Image Capturing Scene)

Figure 5:
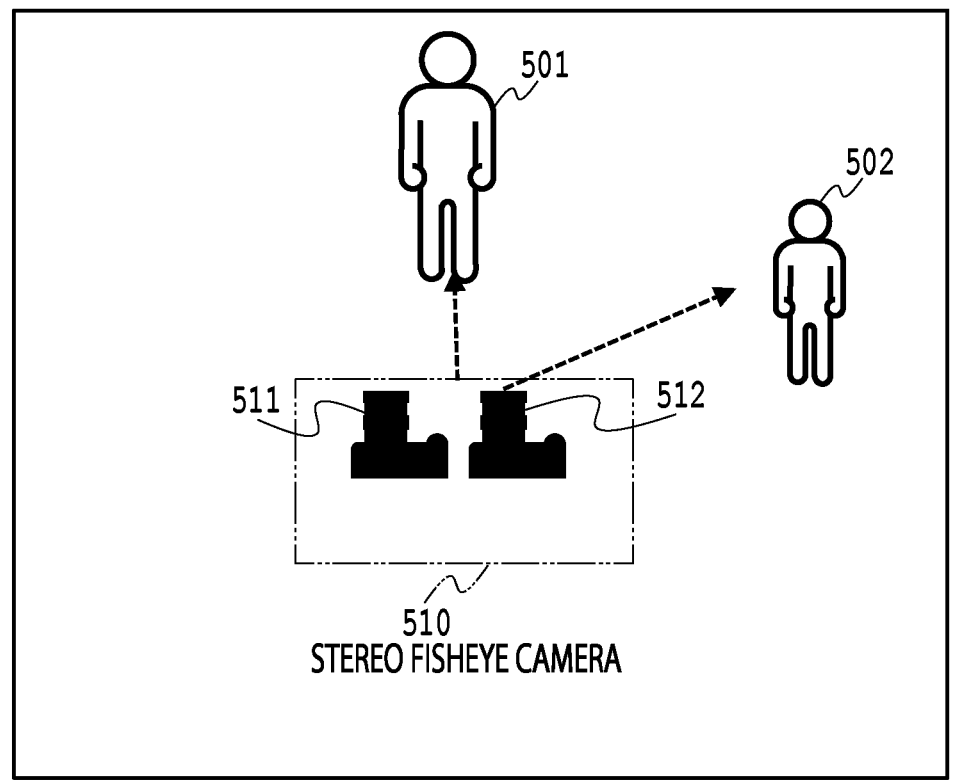
FIG. 5 is a diagram illustrating the configuration of an image capturing apparatus and an exemplary image capturing scene.

The left-eye and right-eye images $I_L$ and $I_R$ illustrated in FIG. 4 will be described below with reference to FIG. 5 illustrating the configuration of an image capturing apparatus and an exemplary image capturing scene. As illustrated in FIG. 5, an image capturing apparatus that obtains the left-eye and right-eye images $I_L$ and $I_R$ by image capturing is a stereo camera (parallax image capturing apparatus) including two image capturing systems and is a stereo fisheye camera 510 including two fisheye lenses 511 and 512 arranged in the right-left direction. In a case where image capturing is performed by the stereo fisheye camera 510, an object 501 positioned in front of the stereo fisheye camera 510 like FIG. 4 is captured with a small elevation angle misalignment through the left and right fisheye lenses 511 and 512 of the stereo fisheye camera 510. However, for example, an object 502 positioned at a place separated from the front of the stereo fisheye camera 510 is captured with a larger elevation angle misalignment through the left and right fisheye lenses 511 and 512 of the stereo fisheye camera 510 as the absolute value of the azimuth angle of the object increases. In other words, the same object is captured with a larger elevation angle misalignment as separation from the center of the left and right fisheye lenses 511 and 512 of the stereo fisheye camera 510 increases in the azimuth angle.

(Cause of Elevation Angle Misalignment in 180° Equirectangular Parallax Image)

Figure 6A:
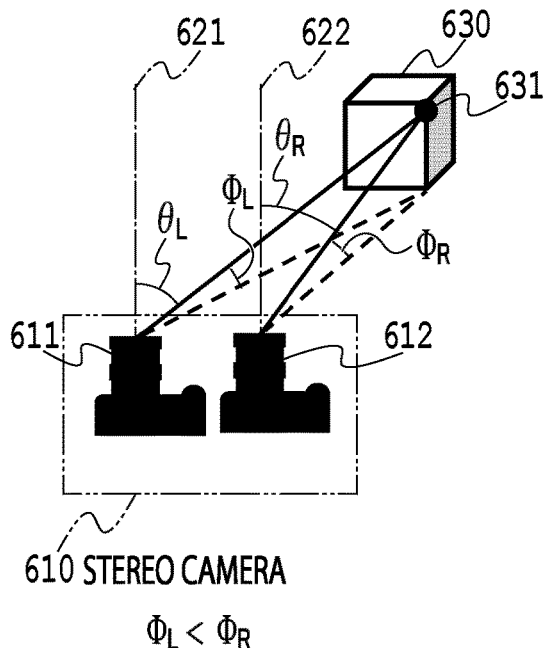
FIGS. 6A and 6B are diagrams for description of the cause of elevation angle misalignment in a 180° parallax image.
Figure 6B:
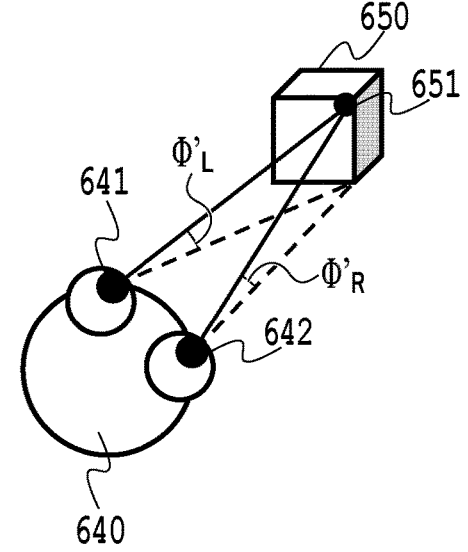

FIGS. 6A and 6B are diagrams for description of the cause of elevation angle misalignment in a 180° equirectangular parallax image. FIG. 6A illustrates a state in which a stereo camera captures an image of an object, and FIG. 6B illustrates a state in which a person views the object. The positional relation between the stereo camera and the object illustrated in FIG. 6B is the same as the positional relation between the person and the object illustrated in FIG. 6B. The person is in a desirable state when viewing the object and in a state of viewing the object at the front.

In FIG. 6A, references are optical axis directions 621 and 622 of left and right lenses 611 and 612 included in a stereo camera (parallax image capturing apparatus) 610. For example, a rectangular parallelepiped object 630 is present at a position where the absolute values of azimuth angles $\theta_L$ and $\theta_R$ relative to the references are large. In this case, the difference between the distance from the left side lens 611 to a position 631 of an apex A of the object 630 and the distance from the right side lens 612 to the position 631 of the object 630 tends to be large. Accordingly, elevation angle misalignment is large in regions where the absolute value of the azimuth angle is large in a 180° equirectangular parallax image. Furthermore, the amount of elevation angle misalignment changes with the distance from the stereo camera (parallax image capturing apparatus) to the object. In other words, elevation angle misalignment increases as the distance from the stereo camera to the object decreases, but elevation angle misalignment decreases as the distance from the stereo camera to the object increases.

As illustrated in FIG. 6B, when a person 640 views an object 650 at the front, the difference between the distance from a left eye 641 of the person 640 to a position 651 of an apex A of the object 650 and the distance from a right eye 642 of the person 640 to the position 651 of the object 650 desirably disappears. In other words, when the person 640 views the object 650, an elevation angle $\phi'_L$ in a view of the position 651 of the object 650 with the left eye 641 of the person 640 and an elevation angle $\phi'_R$ in a view of the position 651 of the object 650 with the right eye 642 of the person 640 are desirably equal.

The user on which the head-mounted display is mounted views a left-eye image with the left eye and views a right-eye image with the right eye, and accordingly, views the same object in the images at the front. Thus, similarly to the case of FIG. 6B, the corresponding elevation angles in the left-eye and right-eye images are desirably equal when a position P of the object is viewed with the left and right eyes of the user. However, in a case where the elevation angle is not equal between corresponding pixels in the left-eye and right-eye images when the object is viewed, the images potentially cause difficulty in fusion of the images when viewed and cause discomfort when viewed. Thus, in the present embodiment, elevation angle misalignment of an incident light ray between corresponding pixels in left-eye and right-eye images is corrected to achieve a desirable state when a person views an object. Accordingly, it is possible to reduce difficulty in fusion of the images when the images are viewed and reduce the likelihood of causing discomfort when the images are viewed.

At S302, the image correspondence calculation unit 211 generates, based on the left-eye and right-eye images $I_L$ and $I_R$, association data (association information) representing a correspondence relation linking pixels in the left-eye image with pixels in the right-eye image corresponding to pixels in the left-eye image. The generated association data (association information) is sent to the misalignment amount calculation unit 212.

In the present embodiment, a method of linking pixels in the left-eye image with pixels in the right-eye image corresponding to pixels in the left-eye image by stereo matching is employed as the method of association for each pixel. Specifically, in the following description, for the coordinate (x, y) of each pixel in the right-eye image $I_R$, the coordinate (x', y') of a pixel in the left-eye image $I_L$ corresponding to the coordinate (x, y) of the pixel in the right-eye image $I_R$ is calculated. However, with reference to the coordinate of each pixel in the left-eye image $I_L$, the coordinate of the corresponding pixel in the right-eye image $I_R$ may be calculated. A region of N×M pixels centered at the coordinate (x, y) of a pixel $P_i$ (i=1, 2, . . . , w×h) in the right-eye image $I_R$ is denoted by $A_R$, and the region $A_R$ is used as a template. The entire left-eye image $I_L$ is scanned to calculate a similarity with the region $A_R$, and the coordinate of a center pixel in a region $A_L$ with the highest similarity is determined as the coordinate (x', y') of the corresponding pixel. The width and height of an equirectangular image are denoted by w and h. Matching is performed for all pixels in the right-eye image $I_R$ to calculate corresponding coordinates. An evaluation indicator of the similarity may be one with which similarity between regions can be evaluated, such as the sum of squared difference (SSD) or the sum of absolute difference (SAD). Although the case where the entire left-eye image $I_L$ is scanned is described above, the present disclosure is not limited thereto. For example, the range of scanning may be restricted to only the epipolar line on the left-eye image $I_L$ corresponding to the coordinate (x, y). In this case, calculation can be highly accurately performed at high speed. Moreover, although the association by stereo matching is described above, the present disclosure is not limited thereto. For example, feature points may be detected and associated, and pixels may be associated based on the result of the feature point association. The corresponding coordinate of a pixel for which no feature point is detected may be calculated by interpolation with the association result of feature points in surroundings.

At S303, the misalignment amount calculation unit 212 calculates the vertical misalignment amount of the right-eye image based on the association data obtained at S302. The calculated misalignment amount is output to the correction amount calculation unit 214. For the coordinate (x, y) of the pixel $P_i$ in the right-eye image $I_R$, a misalignment amount $d_i$ of the coordinate (x', y') of the corresponding pixel in the left-eye image $I_L$ is calculated as the difference between the corresponding coordinates. In other words, the misalignment amount is calculated as $d_i=y'-y$.

At S304, the correction weight calculation unit 213 calculates the correction weight of each pixel in the 180° equirectangular images. The calculated correction weight of each pixel is output to the correction amount calculation unit 214. The correction weight of each pixel is calculated in accordance with the angle of an incident light ray recorded in the pixel based on the positional relation between left and right image capturing apparatuses (lenses) included in the parallax image capturing apparatus. Specifically, the correction weight in the front direction in which the absolute value of the azimuth angle is small is calculated to be smaller than in directions other than the front direction, and the correction weight with a larger absolute value of the azimuth angle is calculated to be larger than in the front direction. The front direction has a range in which the azimuth angle $\theta$ is $-\pi/4$ to $\pi/4$, for example. Accordingly, it is possible to reduce the influence of error in misalignment amount calculation on an object at the front, which has a small elevation angle misalignment and a small correction effect. In a region where the absolute value of the azimuth angle is large and the correction effect is large, the correction effect can be obtained by increasing weights.

The correction weight in a region where the absolute value of the elevation angle is small in the elevation direction is calculated to be larger than in regions other than the region with the small absolute value, and the correction weight in a region where the absolute value of the elevation angle is large is calculated to be smaller than in regions other than the region with the large absolute value. In regions near the zenith and nadir poles, which are regions where the absolute value of the elevation angle is large, the entire region of the azimuth angle is potentially included in a display range when the images are viewed, and thus the correction weight is calculated to be smaller to prevent misalignment due to correction.

The correction weight $w_i$ of the pixel $P_i$ in the right-eye image is calculated as the product of a weight function $w_1(\theta_i)$, which is calculated from the azimuth angle $\theta_i$ of an incident light ray on the pixel $P_i$, and a weight function $w_2(\phi_i)$, which is calculated from the elevation angle $\theta_i$ of the incident light ray on the pixel $P_i$. In other words, the correction weight $w_i$ is calculated as $w_i=w_1(\theta_i)\times w_2(\phi_i)$. An X axis that is the horizontal axis of an equirectangular image (right-eye image) corresponds to the azimuth angle of the incident light ray, and a Y axis that is the vertical axis of the equirectangular image (right-eye image) corresponds to the elevation angle. Thus, the azimuth angle $\theta_i$ of the pixel $P_i$ is calculated as $\theta_i=\pi/2\times(x-w/2)$, and the elevation angle $\phi_i$ of the pixel $P_i$ is calculated as $\phi_i=-\pi/2\times(y-h/2)$.

(Calculated Correction Weight in 180° Equirectangular Image)

FIG. 7A is a diagram for description of the calculated correction weight in 180° equirectangular images. In FIG. 7A, color brightness represents the magnitude of the correction weight, with darker brightness for the larger correction weight and brighter brightness for the smaller correction weight. The maximum value of the magnitude of the correction weight is a numerical value smaller than one, and the minimum value of the magnitude of the correction weight is a numerical value larger than zero. As illustrated in FIG. 7A, in a region where the absolute value of the elevation angle $\phi$ is small and the absolute value of the azimuth angle $\theta$ is large, the correction weight is calculated to be large and strong correction is performed. In regions in the front direction and near the poles, the correction weight is calculated to be small and weak correction is performed.

(Weight Functions)

FIG. 7B is a diagram illustrating an exemplary weight function $w_1(\theta)$ of the azimuth angle $\theta$. FIG. 7C is a diagram illustrating an exemplary weight function $w_2(\phi)$ of the elevation angle $\phi$. The weight functions $w_1$ and $w_2$ are expressed by using a sigmoid function as described below.

$$w_1(\theta) = \text{sigmoid}(|k_1 \times \theta|) \tag{1}$$

$$w_2(\phi) = \text{sigmoid}(1 - |k_2 \times \phi|)$$

$$\text{sigmoid}(x) = \frac{1}{1 + e^{(-x+c)*d}}$$

In the expressions, $k_1$ is a coefficient for normalizing the azimuth angle $\theta$ from $[-\pi/2$ to $\pi/2]$ to $[-1$ to $1]$, and $k_2$ is a coefficient for normalizing the elevation angle $\phi$ from $[-\pi/2$ to $\pi/2]$ to $[-1$ to $1]$. In addition, c is a parameter for controlling the center of the sigmoid function, and d is a parameter for controlling the width of the sigmoid function.

By adjusting the correction amount by using these weights, it is possible to reduce the influence of failure of pixel association between the left-eye and right-eye images and reduce the likelihood of causing discomfort due to vertical misalignment (vertical parallax misalignment) when the images are viewed. Moreover, an important region such as a face region in the images may be detected and weights with numerical values larger than weights calculated by using the weight functions may be set to the region. For example, an existing image recognition method may be used as the method of face region detection. Specifically, a method of detecting a face region indicating the position and size of a face included in an image by using a face detector trained with face images through a neural network may be used. Alternatively, a method of detecting a face region indicating the position and size of a face included in an image by matching processing using a face image template may be used. Accordingly, elevation angle misalignment of an important region can be strongly corrected. In a case where the weight of a partial region is set to be large to prevent image misalignment due to abrupt change of the correction amount, the size of the weight may be adjusted in a peripheral region of a detection region so that the weight smoothly changes between the detection region and the peripheral region.

At S305, the correction amount calculation unit 214 calculates the correction amount of each pixel in the right-eye image $I_R$ based on the misalignment amount and correction weight of the pixel. The calculated correction amount of each pixel is sent to the image correction unit 215. A correction amount $c_i$ of the pixel $P_i$ (x, y) in the right-eye image $I_R$ is calculated as the product of the misalignment amount $d_i$ and the correction weight $w_i$ at the corresponding coordinate. In other words, the correction amount $c_i$ is calculated as $c_i=d_i\times w_i$.

At S306, the image correction unit 215 generates a corrected right-eye image $I_R'$ based on the correction amount of each pixel in the right-eye image $I_R$. Then, the left-eye image $I_L$ and the corrected right-eye image $I_R'$ thus generated are sent to the image output unit 203.

The corrected value of each pixel $P_i'$ in the right-eye image $I_R'$ is obtained by sampling the value of a pixel shifted in the Y-axis direction by the correction amount $c_i$ from the pixel $P_i$ in the right-eye image $I_R$. Interpolation at the pixel value sampling may be performed by using an interpolation method such as nearest-neighbor interpolation, bilinear interpolation, or bicubic interpolation, but is not limited thereto.

(180° Equirectangular Parallax Image after Correction)

Figure 8:
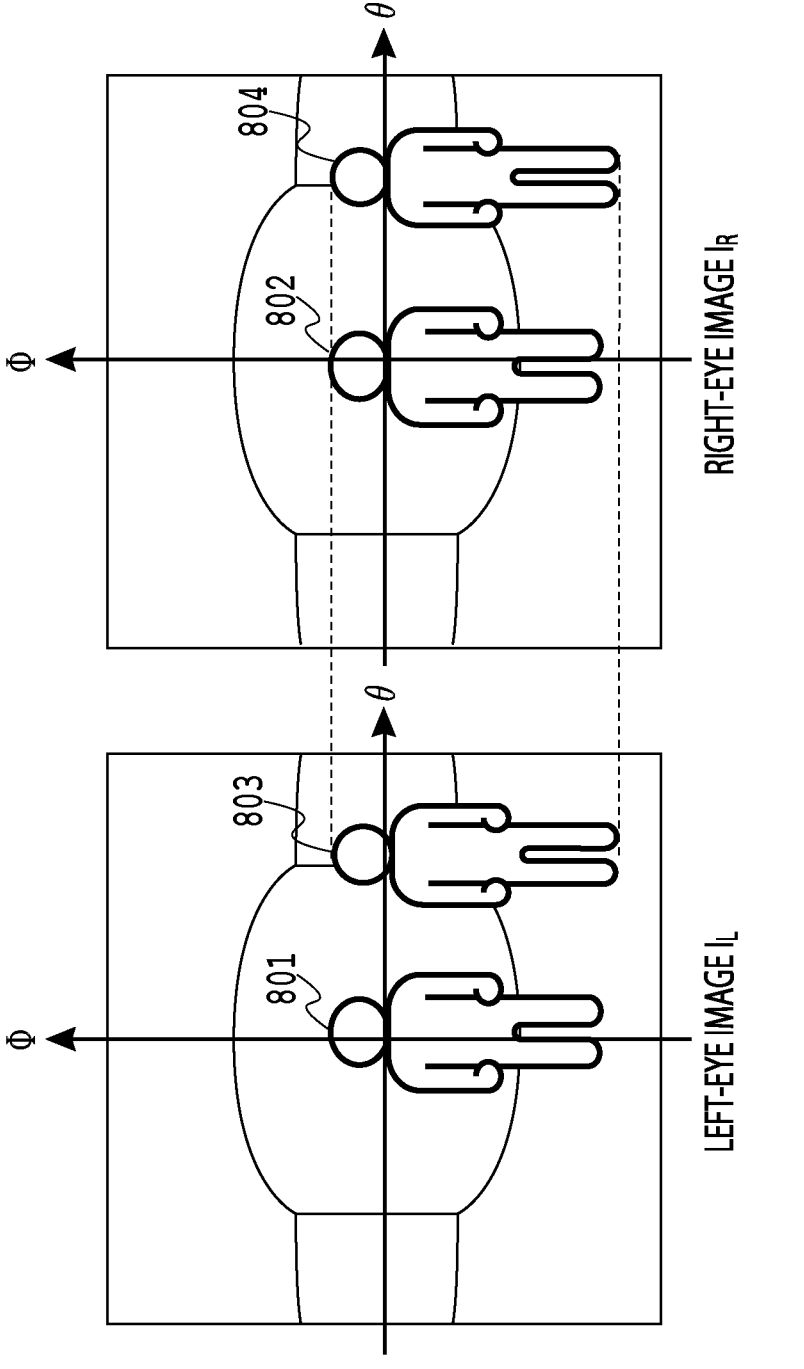
FIG. 8 is a diagram illustrating an exemplary 180° equirectangular parallax image after correction.

FIG. 8 is a diagram illustrating an exemplary 180° equirectangular parallax image after correction, which are obtained by correcting vertical misalignment between the 180° equirectangular parallax image illustrated in FIG. 4. Through the correction of the present embodiment, elevation angle misalignment between the left-eye and right-eye images for an object having an elevation angle that is different between the left-eye and right-eye images, such as the objects 403 and 404 illustrated in FIG. 4, is reduced like objects 803 and 804 illustrated in FIG. 8. Moreover, for objects 801 and 802 at the front, the correction amount is small and misalignment due to correction does not occur. With this correction based on the weight in accordance with the misalignment amount and the angle of an incident light ray for each pixel, it is possible to obtain images with a reduced difficulty in fusion of the images when the images are viewed and a reduced likelihood of causing discomfort when the images are viewed. Moreover, the images can be fused even at places where the absolute value of the azimuth angle is large and the distance to an object is short, and thus an image capturing range with a small likelihood of causing discomfort can be increased. In the present embodiment, the aspect of correcting only the right-eye image is described above, but the present disclosure is not limited thereto. The right-eye image and the left-eye image paired with the right-eye image may be both corrected by, for example, dividing the correction amount into halves. Alternatively, the right-eye image may be not corrected but only the left-eye image paired with the right-eye image may be correcting.

At S307, the image output unit 203 outputs, as an image file to the HDD 105, the left-eye image $I_L$ and the corrected right-eye image $I_R'$ thus generated. When output to the HDD 105 as an image file in this manner, the left-eye and right-eye images can be used as images for a predetermined display apparatus such as a head-mounted display.

As described above, according to the present embodiment, it is possible to generate an image by correcting elevation angle misalignment in a 180° equirectangular parallax image. Thus, even in a case where the direction of the parallax image capturing apparatus and the direction in which the user views a video are misaligned by a predetermined angle, it is possible to reduce vertical misalignment of objects between a left-eye display image and a right-eye display image displayed on a head-mounted display. As a result, it is possible to obtain an image with a reduced likelihood of causing discomfort when viewed with a predetermined display apparatus for causing the user to perceive a stereoscopic image, such as a head-mounted display.

Second Embodiment

The present embodiment will describe an aspect of inputting a parallax image and mesh data for display of the parallax image and correcting a UV coordinate of the mesh data based on the parallax image to reduce vertical misalignment between display images when the images are viewed. Difference from the first embodiment will be mainly described in the present embodiment.

The information processing apparatus 100 according to the present embodiment has the same hardware configuration as the information processing apparatus according to the first embodiment illustrated in FIG. 1, and thus detailed description thereof is omitted.

The mesh data is data used to display a parallax image on a predetermined display apparatus such as a head-mounted display that is an output device. The mesh data includes the origin of a three-dimensional space and information for three-dimensional disposition in a three-dimensional computer graphics (3DCG) space with which the angle of each apex in the mesh data becomes equal to the angle of an incident light ray recorded in each pixel of the parallax image. An image to be displayed on an output device (display) can be generated by disposing a parallax image in the 3DCG space by mapping as texture to the mesh data and rendering based on a virtual viewpoint (virtual camera). In a case of display on a head-mounted display, conversion processing with taken into account a device characteristic such as distortion of an eyepiece lens is additionally executed on an image subjected to the above-described rendering. In other words, in the present embodiment, the mesh data for reducing vertical misalignment between left-eye and right-eye images, which occurs to display images, is generated. In an example described in the present embodiment, a parallax image is a fisheye image obtained by image capturing with a parallax image capturing apparatus including two fisheye lenses (parallax fisheye lens), but the present disclosure is not limited thereto. Parallax images may be images other than fisheye images, such as stereo images or panorama images (wide-angle images).

(Functional Configuration of Information Processing Apparatus)

Figure 9:
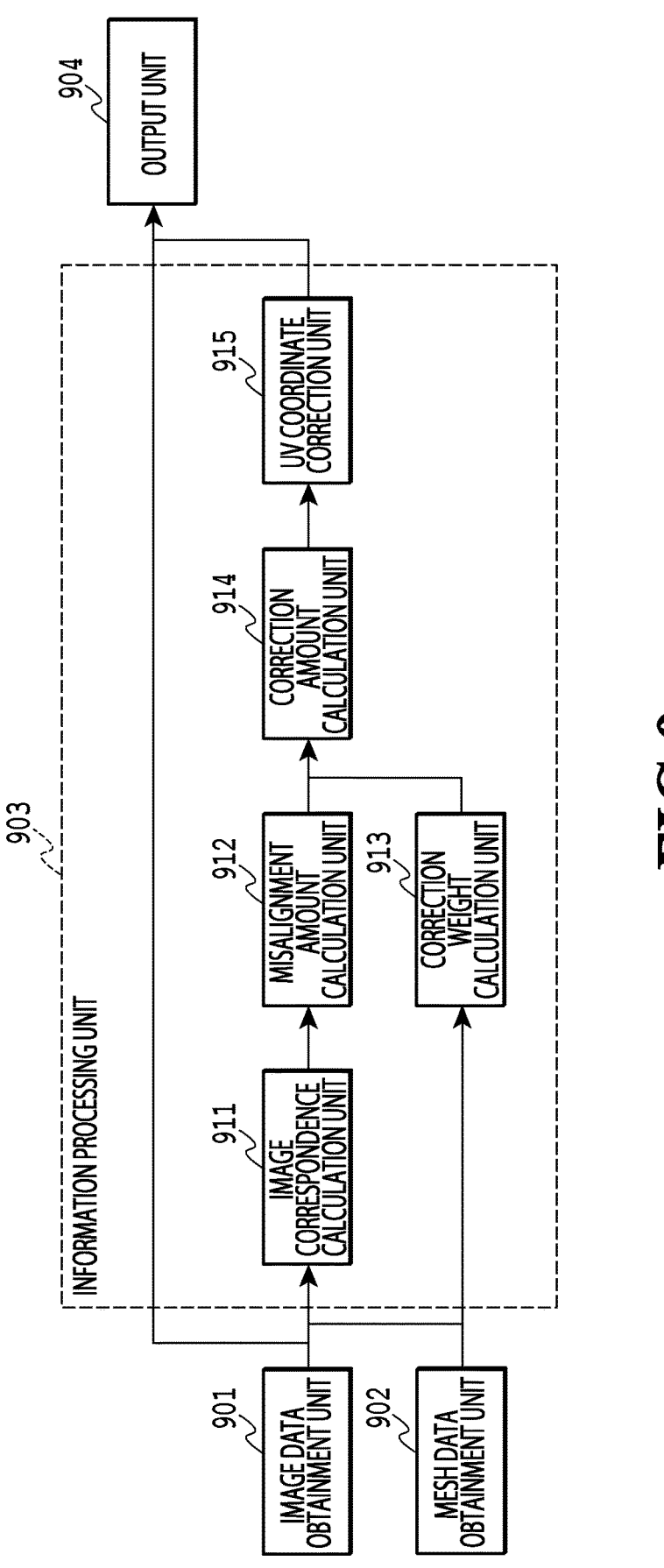
FIG. 9 is a block diagram illustrating an exemplary functional configuration of the information processing apparatus.

FIG. 9 is a block diagram illustrating an exemplary functional configuration of the information processing apparatus 100 according to the present embodiment. The information processing apparatus 100 of the present embodiment corrects, based on an input parallax image and input mesh data, the UV coordinate of the mesh data to suppress vertical misalignment between display images.

The information processing apparatus 100 of the present embodiment includes an image data obtainment unit 901, a mesh data obtainment unit 902, an information processing unit 903, and an output unit 904. The information processing unit 903 includes an image correspondence calculation unit 911, a misalignment amount calculation unit 912, a correction weight calculation unit 913, a correction amount calculation unit 914, and a UV coordinate correction unit 915.

In the present embodiment, the information processing unit 903 corrects, based on a parallax image as image data obtained by the image data obtainment unit 901 and mesh data obtained by the mesh data obtainment unit 902, the UV coordinate of the mesh data to suppress vertical misalignment between display images. Display images generated based on the corrected mesh data and the parallax image are output to a head-mounted display, and accordingly, the following effect can be obtained. Specifically, a user on which the head-mounted display is mounted can view images with a reduced likelihood of causing discomfort as compared to a case where the mesh data before the correction is used.

In the information processing unit 903, first, the image correspondence calculation unit 911 associates pixels in a pair of left and right images constituting parallax image and generates association data linking corresponding pixels. In other words, the image correspondence calculation unit 911 associates pixels in left-eye and right-eye images constituting a parallax image and calculates association information indicating the result of the association. The misalignment amount calculation unit 912 calculates the vertical misalignment amount between pixels associated with an apex in the mesh data based on the association data generated by the image correspondence calculation unit 911.

The correction weight calculation unit 913 calculates a correction weight based on the incident angle of a light ray captured by each pixel associated with an apex of the mesh data. The correction amount calculation unit 914 calculates the correction amount of the UV coordinate of each apex based on the vertical misalignment amount acquired through the calculation by the misalignment amount calculation unit 912 and the correction weight acquired through the calculation by the correction weight calculation unit 913. The UV coordinate correction unit 915 corrects the UV coordinate of the mesh data based on the correction amount of each UV coordinate and generates corrected mesh data.

Then, the output unit 904 outputs the parallax image obtained by the image data obtainment unit 901 and the corrected mesh data generated by the information processing unit 903 to the HDD 105 or the like as a file.
(Corrected Mesh Data Generation Processing)

Figure 10:
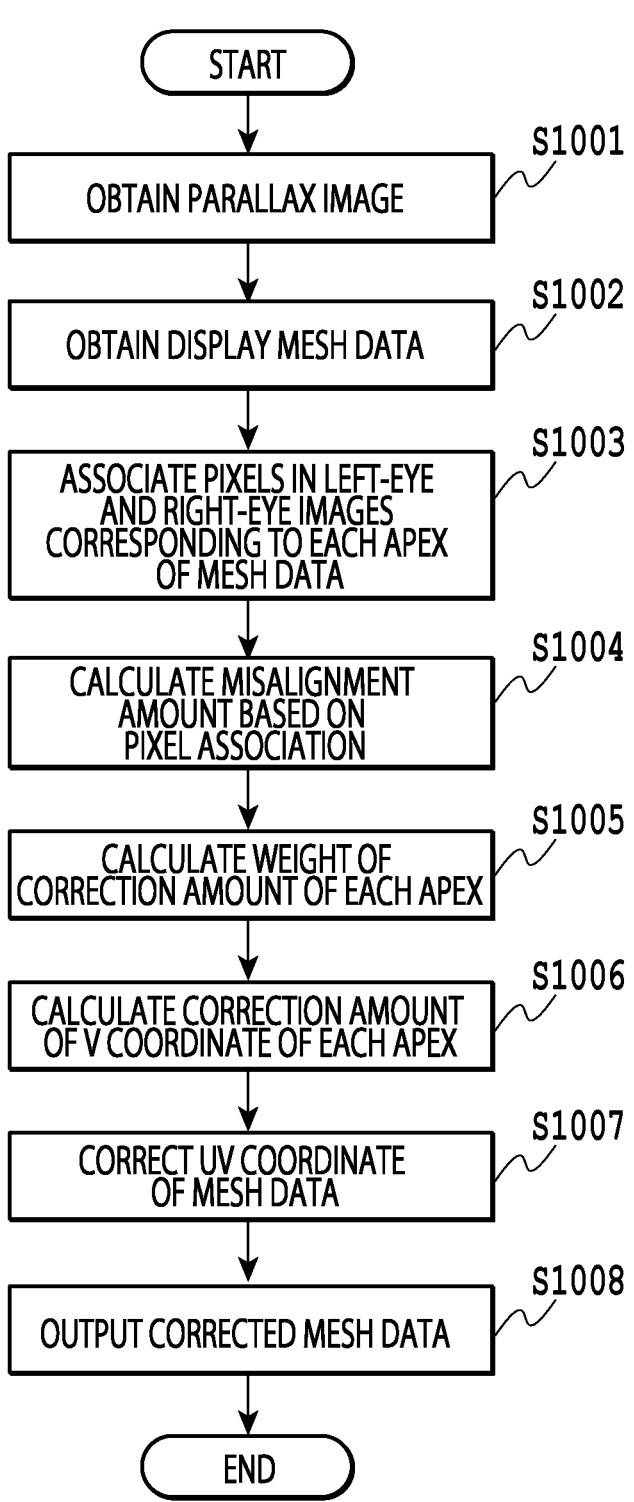
FIG. 10 is a flowchart illustrating the process of processing executed by the information processing apparatus.

FIG. 10 is a flowchart illustrating the process of corrected mesh data generation processing. The functions of blocks in FIG. 9 and steps in FIG. 10 are achieved as the CPU 101 reads program codes stored in a storage region such as the ROM 103 onto the RAM 102 and executes the program codes. Alternatively, the functions of some or all blocks in FIG. 9 and steps in FIG. 10 may be implemented by hardware such as an ASIC or an electronic circuit.

At S1001, the image data obtainment unit 901 obtains image data from the HDD 105 or the input device 107. The obtained image data is sent to the image correspondence calculation unit 911. The image data is image data arranging in the horizontal direction and connecting two images (left-eye and right-eye images) having parallax and acquired by capturing with a parallax image capturing apparatus including two fisheye lenses. The following describes an example in which image data arranging in the horizontal direction and connecting two images having parallax and acquired by capturing with a parallax image capturing apparatus including two fisheye lenses is obtained as the above-described image data. Details of a fisheye parallax image will be described later with reference to diagrams.

At S1002, the mesh data obtainment unit 902 obtains the mesh data from the HDD 105 or the input device 107. The obtained mesh data is sent to the image correspondence calculation unit 911 and the correction weight calculation unit 913.
(Fisheye Parallax Image and Mesh Data)

Figure 11:
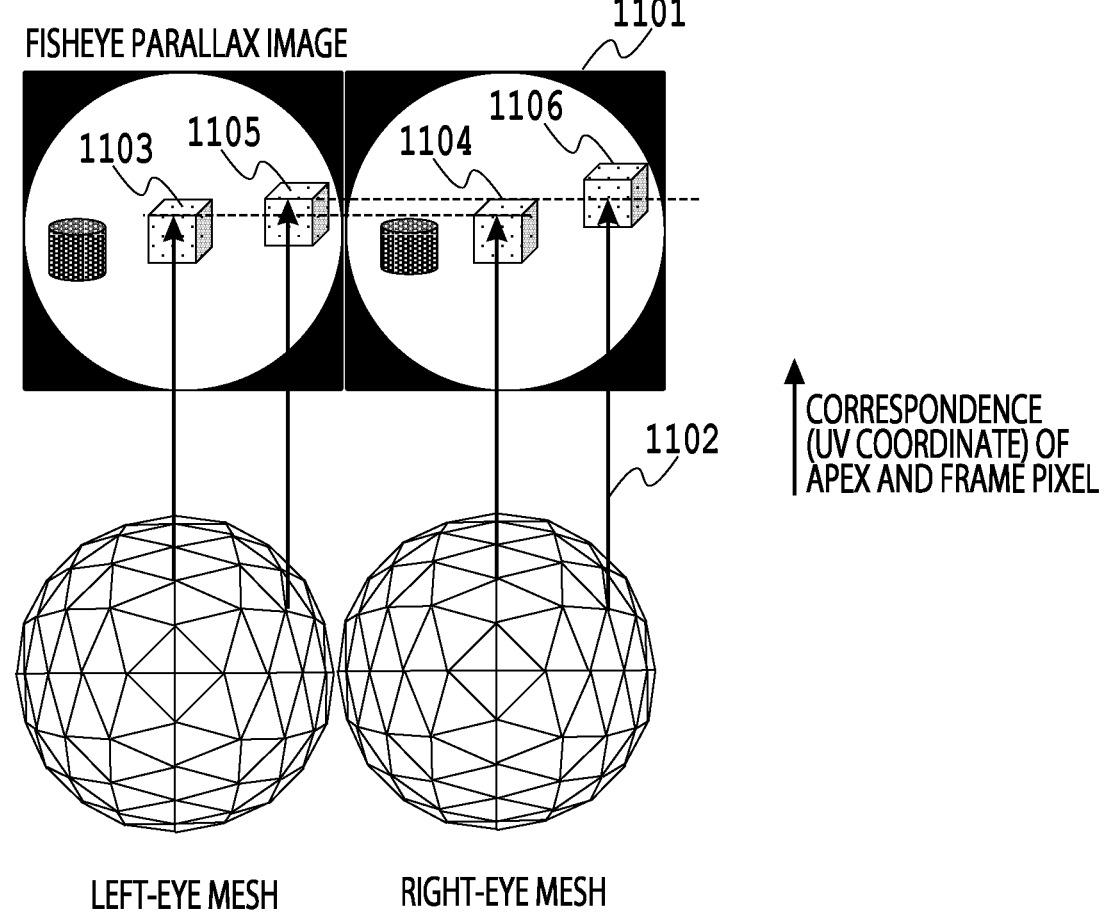
FIG. 11 is a diagram illustrating an exemplary relation between fisheye images with parallax and projection meshes.

FIG. 11 is a diagram illustrating an exemplary fisheye parallax image and exemplary mesh data according to the present embodiment. A fisheye parallax image 1101 includes an image that is acquired by capturing with a left image capturing apparatus (left side lens) included in the parallax image capturing apparatus and is disposed on the left half, and an image that is acquired by capturing with a right image capturing apparatus (right side lens) included in the parallax image capturing apparatus and is disposed on the right half.

Each line 1102 extending to a fisheye parallax image from an apex of a left-eye mesh or a right-eye mesh illustrated in FIG. 11 represents the correspondence relation between the apex and an image coordinate by the UV coordinate. The mesh data includes topology information indicating three-dimensional coordinates representing the positions of a plurality of apexes, UV coordinates associating apexes and image coordinates, and combination of apexes included in triangles representing the mesh surface. The correspondence relation between each apex of the mesh data and a position in the fisheye parallax image as a textures is expressed by a UV coordinate. For example, in a case where an apex coordinate indicating the three-dimensional position of an apex of the mesh data is (X, Y, Z) and the corresponding UV coordinate is (u, v), the apex (X, Y, Z) is associated with one point on a texture indicated by the coordinate (u, v).
(Texture)

Figure 12:
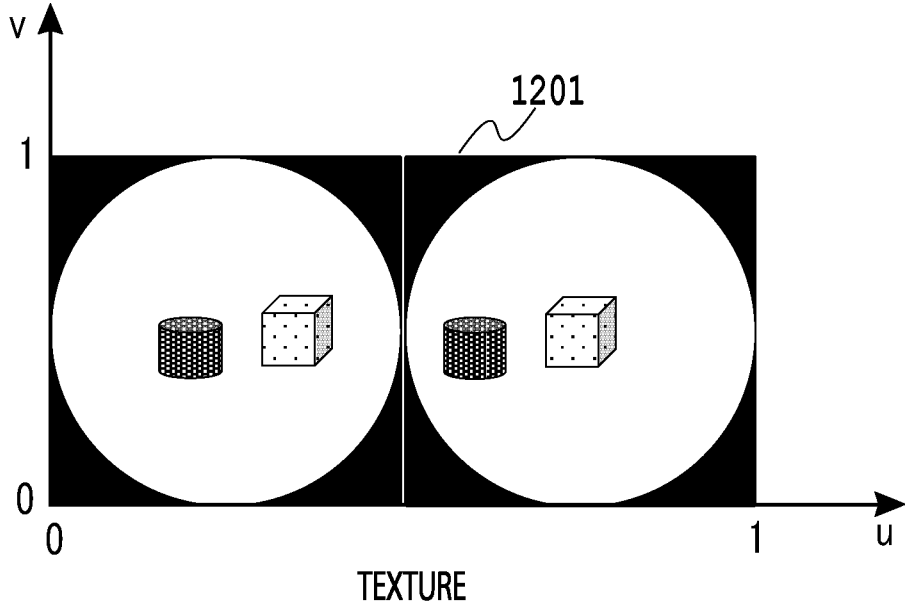
FIG. 12 is a diagram illustrating a coordinate system with a UV coordinate of the meshes.

FIG. 12 is a diagram illustrating an exemplary texture. In the present embodiment, the UV coordinate is expressed in a coordinate system with a U axis in the lateral direction and a V axis in the longitudinal direction, with an origin (0, 0) at the lower-left of the image, and with (1, V) as the coordinate (u, v) at the right end and (U, 1) as the coordinate (u, v) at the upper end.

The UV coordinate has a range of [0 to 1]. In a case where an apex at the same position or the same object in left and right images appears at a position with the same elevation angle like an object 1103 and an object 1104 captured at the front in the fisheye parallax image, the left and right images can be viewed without vertical misalignment between the images when the head-mounted display is mounted. However, in a case where the position in the vertical direction is different between left and right images like an object 1105 and an object 1106 on the right side in the fisheye parallax image, the images potentially cause difficulty in fusion and a sense of discomfort when viewed with the mounted head-mounted display.

At S1003, the image correspondence calculation unit 911 generates, based on the above-described image data and the above-described mesh data, association data indicating a correspondence relation linking a pixel in a right-eye image region of the image data and a pixel in a left-eye image region corresponding relation to the pixel in the right-eye image region. The above-described image data is data obtained at S1001. The above-described mesh data is data obtained at S1002. The generated association data (association information) is sent to the misalignment amount calculation unit 912.

As in the first embodiment, stereo matching is performed between left-half and right-half regions of the parallax image to generate association data (association information) associating a pixel (x, y) in the right-half region and the corresponding pixel (x', y') in the left-half region. Since correspondence information used at S1004 or later is only for pixels associated with apexes in right-eye mesh data by the UV coordinate, pixels for which the matching is performed may be limited to only for pixels associated with apexes so that processing cost is reduced.

At S1004, the misalignment amount calculation unit 912 calculates the vertical misalignment amount of each parallax image coordinate corresponding to an apex in the mesh data based on the association data obtained at S1003. The calculated misalignment amount is sent to the correction amount calculation unit 914.

A misalignment amount $d_v$ of the coordinate (x', y') of a corresponding pixel in the left-half region of the image to the coordinate (x, y) of a pixel in the right-half region of the image is calculated by converting the difference between the corresponding coordinates into a V coordinate value in the UV coordinate system. In other words, the misalignment amount $d_v$ is calculated as $d_v=-(y'-y)/h$. In the formula, v is the index ($v=0, 1, \ldots, n_r$) of an apex, $n_r$ is the number of apexes of the right-eye mesh, and h is the height of the fisheye parallax image.

At S1005, the correction weight calculation unit 913 calculates a correction weight of the V coordinate of each apex in the mesh. The calculated correction weight is output to the correction amount calculation unit 914.

In the aspect described above in the first embodiment, correction weights are calculated by obtaining the angle of an incident light ray at each pixel in equirectangular images, but in the present embodiment, a correction weight $w_v$ is calculated by using, as the angle of an incident light ray, the azimuth angle $\theta_v$ and the elevation angle $\phi_v$ of an apex v when viewed from the origin. Correction weights based on the azimuth angle and elevation angle of an incident light ray are calculated by the same weight functions as in the first embodiment.

At S1006, the correction amount calculation unit 914 calculates the correction amount of the V coordinate of each mesh apex based on the misalignment amount of the V coordinate of the mesh apex calculated at S1004 and the correction weight calculated at S1005. The calculated correction amount is sent to the UV coordinate correction unit 915. A correction amount $c_v$ of the V coordinate corresponding to a right-eye mesh apex is calculated as the product of the misalignment amount $d_v$ and the correction weight $w_v$ of the corresponding coordinate. In other words, the correction amount $c_v$ is calculated as $c_v=d_v\times w_v$.

At S1007, the UV coordinate correction unit 915 generates corrected mesh data based on the correction amount of the V coordinate corresponding to each apex of the right-eye mesh data. In other words, coordinates represented by the right-eye mesh data are corrected. The corrected mesh data thus generated is sent to the output unit 904. Through application of the corrected mesh data, vertical misalignment between corresponding pixels in the pair of images constituting the parallax image is corrected.

The value of the V coordinate of each apex of the corrected right-eye mesh data is shifted from the original value of the V coordinate by the correction amount $c_v$.

(Corrected Mesh Data)

Figure 13:
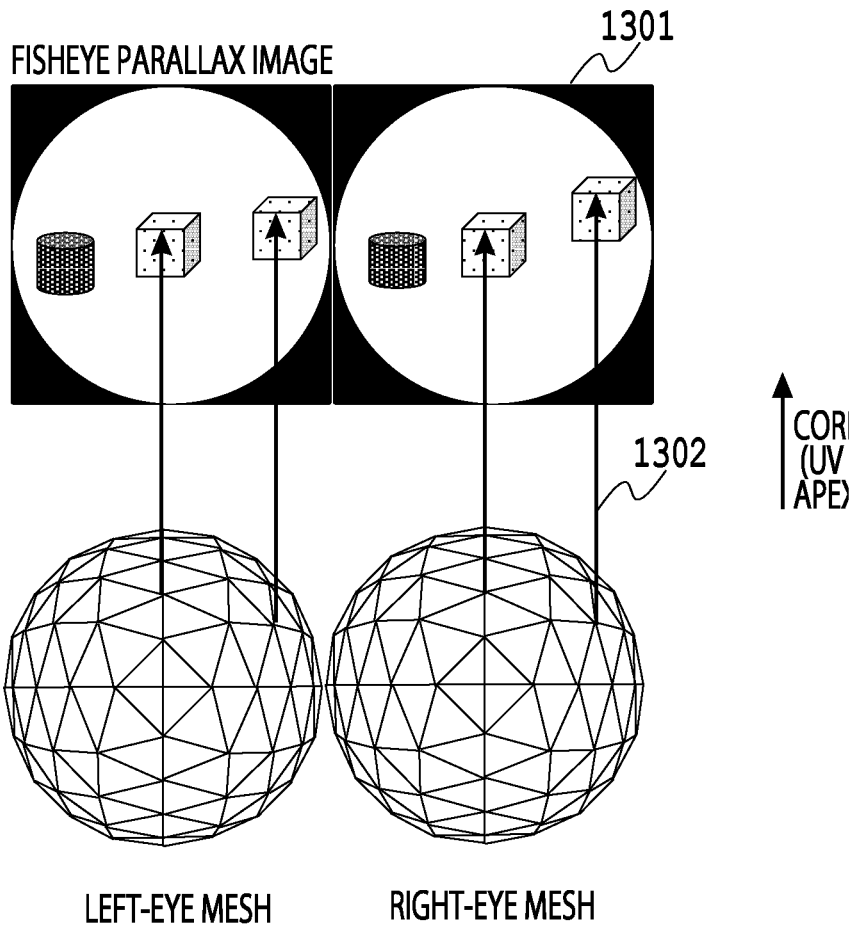
FIG. 13 is a diagram illustrating exemplary corrected mesh data.

FIG. 13 is a diagram illustrating exemplary corrected mesh data. Through the correction of the present embodiment, image positions referred to by apexes of the right-eye mesh data are changed and the same height of an object is referred to at the same apex of the left and right meshes. In this manner, it is possible to reduce difficulty in fusion and the likelihood of causing discomfort when the images are viewed by correcting the V coordinate of each apex based on a weight in accordance with the misalignment amount relative to a reference point and the angle of an incident light ray. Moreover, the images can be fused even at places where the absolute value of the azimuth angle is large and the distance to an object is short, and thus an image capturing range with a small likelihood of causing discomfort can be increased. In the present embodiment, the aspect of correcting only the right-eye mesh data is described above, but the present disclosure is not limited thereto. For example, the right-eye mesh data and the left-eye mesh data paired with the right-eye mesh data may be both corrected by, for example, dividing the correction amount into halves. Alternatively, the right-eye mesh data may be not corrected but only the left-eye mesh data paired with the right-eye mesh data may be corrected.

At S1008, the output unit 904 outputs, as a file to the HDD 105, the fisheye parallax image and the corrected mesh data thus generated. When output to the HDD 105 as a file in this manner, the mesh data can be used as data for a predetermined display apparatus such as a head-mounted display.

As described above, according to the present embodiment, it is possible to generate mesh data for displaying a fisheye parallax image with corrected elevation angle misalignment. Thus, even in a case where the direction of the parallax image capturing apparatus and the direction in which the user views a video is misaligned by a predetermined angle, it is possible to reduce vertical misalignment of objects between a left-eye display image and a right-eye display image displayed on a head-mounted display. As a result, it is possible to obtain data with a reduced likelihood of causing discomfort when viewed with a display apparatus for causing the user to perceive a stereoscopic image, such as a head-mounted display.

Other Embodiments

The present disclosure is not limited to the above-described embodiments but may be achieved in various embodiments. The misalignment amount of an object is calculated for each pixel in the above-described embodiments, but the present disclosure is not limited thereto. For example, it may be assumed that all objects exist at an object distance calculated from a focus position at image capturing, and the correction amount may be calculated without misalignment amount calculation. Alternatively, the object distance may be assumed based on an image capturing condition such as an image capturing mode instead of the focus position, and the correction amount may be calculated.

In the above-described aspect, the correction amount of each pixel is calculated in accordance with the misalignment amount of an object and the correction weight, but the present disclosure is not limited thereto. A table that stores the correction amount for each angle of an incident light ray may be prepared in advance, and correction may be performed by using the correction amount obtained from this correction amount table. FIG. 14 is a diagram illustrating an exemplary relation among the azimuth angle $\theta$, the elevation angle $\phi$, and the correction weight. A correction amount table 1400 is a table indicating the relation among the azimuth angle $\theta$ and the elevation angle $\phi$, which are collectively denoted by 1401, and a correction weight 1402. In a case of the correction amount of each mesh apex, a V-coordinate correction amount determined from the angle of the apex relative to the origin may be obtained and used for correction. In other words, different correction amounts may be set in accordance with positions in a parallax image. In the correction amount setting, the above-described correction amount may be set such that the correction weight decreases as the absolute value of the elevation angle of an image capturing apparatus that captures the parallax image, which is recorded in each pixel of the parallax image, increases. Moreover, in the correction amount setting, the above-described correction amount may be set such that the correction weight increases as the absolute value of the azimuth angle of the above-described image capturing apparatus increases.

In the above-described aspect, an image is input, but the present disclosure is not limited thereto. In a case where a temporally sequential moving image is input, left and right images may be associated by selecting a predetermined one frame in the moving image. Specifically, association data linking corresponding pixels in left and right images (pair of images) may be generated based on a predetermined one frame that is obtained.

In the above description, an image is input, but in a case where a temporally sequential moving image is input, a background image excluding any moving body as an object that moves may be generated from the moving image, and left and right images may be associated by using the generated background image. Specifically, association data linking corresponding pixels in left and right images (pair of images) may be generated based on the generated background image. The background image may be generated by arranging outputs obtained by applying a temporal median filter to pixels of the moving image. Alternatively, the background image may be generated by performing moving body detection in each frame of the moving image and calculating an image color average in the time direction only in a background region excluding any detected moving body region.

In the above-described aspect, association data linking corresponding pixels in a pair of images constituting a parallax image is generated and vertical misalignment between corresponding pixels in the pair of images is corrected based on the generated association data, but the present disclosure is not limited thereto. Specifically, association data linking corresponding regions each constituted by a plurality of pixels in the pair of images may be generated and vertical misalignment between corresponding regions in the pair of images may be corrected based on the generated association data.

In the above-described aspect, a parallax image for achieving stereoscopic vision with correction weights is generated, but the present disclosure is not limited thereto. For example, a parallax image for achieving stereoscopic vision without correction weights may be generated. Alternatively, mesh data for displaying a parallax image without correction weights may be generated.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technologies of the present disclosure, it is possible to obtain a parallax image for achieving stereoscopic vision with a reduced likelihood of causing discomfort.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-188500, filed Nov. 2, 2023, which is hereby incorporated by reference herein in its entirety.

What is claimed is:

1. An information processing apparatus comprising:
an obtainment unit configured to obtain a pair of images constituting a parallax image for achieving stereoscopic vision;
an association unit configured to generate association data linking corresponding pixels in the pair of images constituting the parallax image obtained by the obtainment unit;
a correction unit configured to correct vertical misalignment between corresponding pixels in the pair of images based on the generated association data; and
a derivation unit configured to derive a correction weight of each pixel constituting the parallax image,
wherein the derivation unit derives the correction weight in accordance with an angle of a light ray relative to an optical axis direction of an image capturing apparatus that captures the parallax image, the angle being recorded in each pixel of the parallax image, and
wherein the derivation unit derives the correction weight that decreases as the absolute value of the elevation angle of the light ray increases, the elevation angle being recorded in each pixel of the parallax image.

2. The information processing apparatus according to claim 1, wherein the correction unit corrects one or both of the pair of images.

3. The information processing apparatus according to claim 1, wherein the obtainment unit obtains mesh data for displaying the parallax image, and
wherein the correction unit corrects vertical misalignment between corresponding pixels in the pair of images constituting the parallax image by correcting, based on the generated association data, coordinates indicated by the mesh data obtained by the obtainment unit.

4. The information processing apparatus according to claim 1, wherein the derivation unit derives the correction weight by using a sigmoid function.

5. The information processing apparatus according to claim 1, further comprising a generation unit configured to generate a background image excluding any moving object from the parallax image, the parallax image being temporally sequential images,
wherein the association unit generates the association data based on the background image generated by the generation unit.

6. The information processing apparatus according to claim 1, wherein the obtainment unit obtains a predetermined one frame in accordance with the parallax image being temporally sequential images, and
wherein the association unit generates the association data based on the predetermined one frame obtained by the obtainment unit.

7. The information processing apparatus according to claim 1, further comprising a setting unit configured to set a correction amount to each pixel constituting the parallax image, wherein the setting unit sets the correction amount so that the correction weight decreases as the absolute value of the elevation angle of an image capturing apparatus that captures the parallax image increases and the correction weight increases as the absolute value of the azimuth angle of the image capturing apparatus increases, the elevation and azimuth angles being recorded in each pixel of the parallax image.

8. The information processing apparatus according to claim 1, wherein the association unit:

(1) performs matching processing on all pixels of the pair of images constituting the parallax image and generates the association data based on a result of the matching processing, or (2) performs feature point detection processing on the pair of images constituting the parallax image and generates the association data based on a result of the feature point detection processing.

9. The information processing apparatus according to claim 1, wherein the association unit generates the association data linking regions constituted by a plurality of corresponding pixels in the pair of images, and wherein the correction unit corrects vertical misalignment between corresponding regions in the pair of images based on the generated association data.

10. The information processing apparatus according to claim 1, wherein the parallax image is obtained by applying equirectangular projection processing to images acquired by capturing with an image capturing apparatus including two fisheye lenses.

11. The information processing apparatus according to claim 1, wherein the pair of images are made of a left-eye image and a right-eye image paired with the left-eye image and having parallax relative to the left-eye image.

12. An information processing apparatus comprising:

an obtainment unit configured to obtain a pair of images constituting a parallax image for achieving stereoscopic vision;

an association unit configured to generate association data linking corresponding pixels in the pair of images constituting the parallax image obtained by the obtainment unit;

a correction unit configured to correct vertical misalignment between corresponding pixels in the pair of images based on the generated association data; and a derivation unit configured to derive a correction weight of each pixel constituting the parallax image, wherein the derivation unit derives the correction weight in accordance with an angle of a light ray relative to an optical axis direction of an image capturing apparatus that captures the parallax image, the angle being recorded in each pixel of the parallax image, and wherein the derivation unit derives the correction weight that increases as the absolute value of the azimuth angle of the light ray increases, the azimuth angle being recorded in each pixel of the parallax image.

13. The information processing apparatus according to claim 12, wherein the derivation unit derives the correction weight by using a sigmoid function.

14. An information processing method comprising:

obtaining a pair of images constituting a parallax image for achieving stereoscopic vision;

generating association data linking corresponding pixels in the obtained pair of images constituting the parallax image;

correcting vertical misalignment between corresponding pixels in the pair of images based on the generated association data; and deriving a correction weight of each pixel constituting the parallax image, wherein the correction weight is derived in accordance with an angle of a light ray relative to an optical axis direction of an image capturing apparatus that captures the parallax image, the angle being recorded in each pixel of the parallax image, and wherein the correction weight is derived that decreases as the absolute value of the elevation angle of the light ray increases, the elevation angle being recorded in each pixel of the parallax image.

15. A non-transitory computer-readable storage medium storing a program for causing a computer to perform an information processing method, the method comprising:

obtaining a pair of images constituting a parallax image for achieving stereoscopic vision;

generating association data linking corresponding pixels in the obtained pair of images constituting the parallax image;

correcting vertical misalignment between corresponding pixels in the pair of images based on the generated association data; and deriving a correction weight of each pixel constituting the parallax image, wherein the correction weight is derived in accordance with an angle of a light ray relative to an optical axis direction of an image capturing apparatus that captures the parallax image, the angle being recorded in each pixel of the parallax image, and wherein the correction weight is derived that decreases as the absolute value of the elevation angle of the light ray increases, the elevation angle being recorded in each pixel of the parallax image.

* * * * *